(12) United States Patent
Moretto

(10) Patent No.: US 7,569,138 B2
(45) Date of Patent: Aug. 4, 2009

(54) FILTER JUG WITH REPLACEABLE CARTRIDGE AND METHOD OF MONITORING AND CONTROLLING THE EFFICIENCY OF A FILTER CARTRIDGE IN A REPLACEABLE CARTRIDGE FILTER DEVICE

(75) Inventor: Maurizio Moretto, Vicenza (IT)

(73) Assignee: Laica S.p.A., Barbarano Vicentino VI (IT)

( * ) Notice: Subject to any disclaimer, the term of this patent is extended or adjusted under 35 U.S.C. 154(b) by 625 days.

(21) Appl. No.: 10/575,309

(22) PCT Filed: Sep. 16, 2004

(86) PCT No.: PCT/EP2004/010366

§ 371 (c)(1),
(2), (4) Date: Apr. 11, 2006

(87) PCT Pub. No.: WO2005/047189

PCT Pub. Date: May 26, 2005

(65) Prior Publication Data
US 2007/0051671 A1    Mar. 8, 2007

(30) Foreign Application Priority Data
Oct. 28, 2003    (IT)    .......................... PD2003A0262

(51) Int. Cl.
*B01D 35/143*    (2006.01)

(52) U.S. Cl. .................. 210/85; 210/138; 210/282; 210/482

(58) Field of Classification Search .................. 210/85, 210/138, 282, 482; 368/10
See application file for complete search history.

(56) References Cited

U.S. PATENT DOCUMENTS

| | | | | |
|---|---|---|---|---|
| 5,900,138 A | * | 5/1999 | Moretto | 210/85 |
| 6,074,550 A | * | 6/2000 | Hofmann et al. | 210/87 |
| 6,224,751 B1 | * | 5/2001 | Hofmann et al. | 210/85 |

FOREIGN PATENT DOCUMENTS

| | | |
|---|---|---|
| GB | 2250281 | 6/1992 |
| WO | WO 00/66245 | 11/2000 |

OTHER PUBLICATIONS

International Search Report for Int'l Application No. PCT/EP2004/010366 dated Dec. 8, 2004.

* cited by examiner

*Primary Examiner*—Terry K Cecil
(74) *Attorney, Agent, or Firm*—RatnerPrestia

(57) ABSTRACT

A replaceable cartridge filtering jug includes a device for counting and displaying the filtering cycles performed by the cartridge to indicate that the cartridge is exhausted at the end of a period corresponding to its efficient useful life. An auxiliary counting and display device is also included which is capable of counting the filtering cycles performed in a subsidiary period of the period to indicate an item of data representing the temporary efficiency of the cartridge in the subsidiary period.

13 Claims, 1 Drawing Sheet

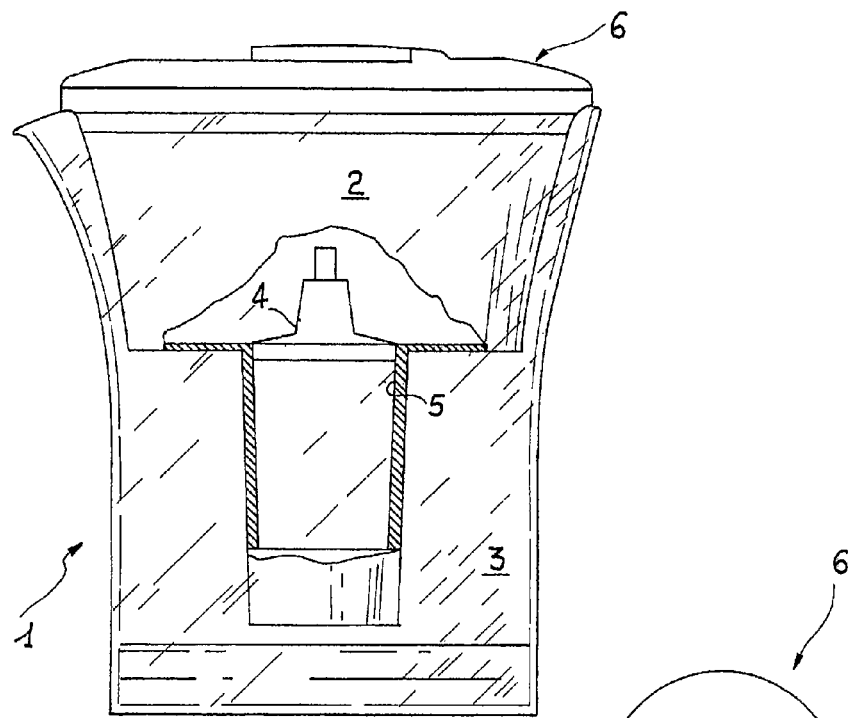
Fig. 1
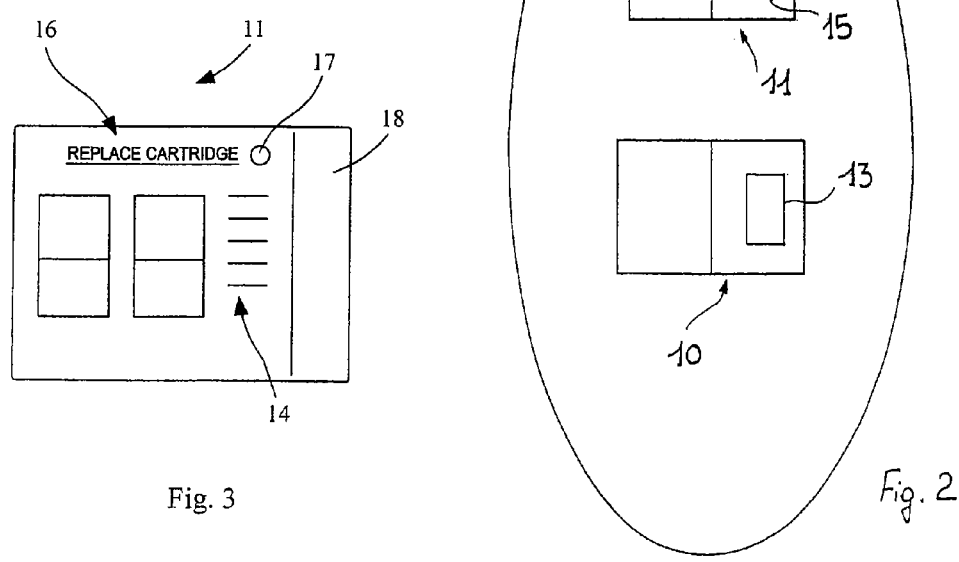
Fig. 3
Fig. 2

FILTER JUG WITH REPLACEABLE CARTRIDGE AND METHOD OF MONITORING AND CONTROLLING THE EFFICIENCY OF A FILTER CARTRIDGE IN A REPLACEABLE CARTRIDGE FILTER DEVICE

This application is a U.S. National Phase Application of PCT International Application PCT/EP2004/010366.

TECHNICAL FIELD

This invention relates to a replaceable cartridge filtering device and a method of monitoring and controlling the efficiency of a filter cartridge, and more particularly, to such device and method having an auxiliary device for counting and displaying filtering cycles of the filtering cartridge performed in a subsidiary period.

TECHNOLOGICAL BACKGROUND

The application of a counting device to filtering jugs, for counting the filtering cycles which take place between each replacement of the cartridge in order to establish and indicate to the user that the cartridge is exhausted when the count indicates that the maximum number of permissible filtering cycles for that cartridge has been reached is known. Generally the counting device is on a lid of the filtering jug. It is also known that such counting may be incorporated with auxiliary counting of the elapsed time between first activation of the cartridge, because in addition to quantitative deterioration through the effect of the total quantity of water processed, the filtering material is also subject to a temporal deterioration over time through the effect of the time which has elapsed since the first use (activation) of the cartridge.

Finally it is known that the filter cartridge (and the filtering material in general) is subject to a "temporary" deterioration of filtering efficiency in relation to the number of filtering cycles performed in the course of a day. This temporary deterioration derives from temporary saturation of the filtering material, which requires a rest time between filtering cycles in order to regenerate itself in order to ensure maximum filtering efficiency throughout the service life of the same. Because of this requirement it is currently provided that a maximum number of permissible daily filtering cycles for satisfactory performance of the filtering jug is recommended in the operating instructions for filter cartridges and/or filtering jugs.

In jugs for filtering drinking water it is however typical that the filtering vessel is filled by different users in the course of the day, for example by the person who uses up the filtered water and therefore refills the jug before placing it back in the refrigerator. It is therefore possible that the number of daily filtering cycles may be exceeded without the users being at all aware of it.

There is also the fact that the maximum number of daily cycles has an influence on the maximum permissible number of cycles for a cartridge, because if the counting means intended to monitor the cartridge are limited to monitoring of the cycles performed they may indicate a number of residual cycles available which is greater than the actual number of cycles available bearing in mind the limitation consequent upon the days available and the maximum number of daily cycles available before the cartridge loses efficiency.

SUMMARY OF THE INVENTION

The problem solved by this invention is that of providing a filtering method and a filtering jug structurally and functionally designed to overcome the disadvantages complained of with reference to the aforesaid prior art. This problem is solved by the invention through a filtering jug and a method of filtering including an auxiliary counting and display device which is adapted to count the filtering cycles performed in a subsidiary period of the period corresponding to the efficient useful life of the cartridge, and thereby represents the temporary efficiency of the cartridge during this subsidiary period.

BRIEF DESCRIPTION OF THE DRAWINGS

Other advantages and characteristics of the present invention will become clear from the following detailed description which is given with reference to the appended drawings which are provided purely by way of non-limiting example and in which:

FIG. 1 is a diagrammatical view of a filtering jug constructed according to the invention, FIG. 2 is a plan view from above a lid of the filtering jug in FIG. 1, FIG. 3 is a detailed view on a magnified scale of the lid in FIG. 2 with reference to a variant embodiment of the invention.

PREFERRED EMBODIMENTS OF THE INVENTION

In the figures, 1 indicates as a whole a filtering jug according to the invention, including a vessel 2 to contain the water which is to be filtered, a vessel 3 to collect the filtered water and a replaceable cartridge 4 which is inserted in a conduit 5 communicating between the two vessels 2, 3.

The jug is closed above by a removable lid 6. In the example illustrated, the jug is filled with water which is to be filtered following the removal of lid 6 to provide access to vessel 2 so that the latter may be filled. It is also provided that the lid may be provided with a filling hole which may possibly be provided with an intercepting gate or which may be only partly opened. Regardless of the specific manner of filling, all of which are contemplated by this invention, the jug is provided with a system for counting and revealing the filtering cycles performed by the cartridge in order to indicate that the cartridge is exhausted at the end of a period corresponding to its efficient useful life. For example such a system may provide mechanical means for detecting cycles in which the lid is opened and successively closed as described in patent EP0788397 (corresponding to US Pat. No. 5,900,138) by the same applicant, which is to be regarded as being included with this description in order to form an integral part thereof, or a system which is electromagnetically or electronically activated, such as for example described in EP0891952 (corresponding to US Pat. No. 6,074,550) or again different systems based on measurement of the flow of water passing through one of the vessels or in the conduits of the jug. In the example in question the means intended for counting and displaying the filtering cycles comprise an electronic circuit 10 associated with a display 11, typically a graphic or alphanumerical liquid crystal display.

Circuit 10 is designed to generate a count of the time elapsed since an initialization stage which typically takes place when a new filter cartridge 4 is placed in the jug, in order to reveal through transducers which are in themselves known signals indicating the start and/or completion of a complete filtering cycle (that is the flow of water through the jug), placing an item of data representing the total flow in memory and comparing the total flow with the maximum total acceptable flow for efficient functioning of the cartridge in order to determine the number of residual cycles available before the cartridge is exhausted. It is also provided that circuit 10 be designed to detect the number of filtering cycles performed with the cartridge in use without making any comparison with the total number of cycles available for the cartridge at the outset, this comparison being subsequently performed by the user on the base of information displayed by display 11.

It is also provided that circuit 10 be designed to make a count of the time elapsed since the initialization stage (first use) of the cartridge in order to signal that the cartridge is exhausted on first occurrence of the expiry time depending upon the time elapsed since the initialization stage or depending upon the number of filtering cycles carried out in all. All these functions are carried out by circuit 10 through a processor controlled by a program whose instructions reflect the stages of the method according to this invention.

Circuit 10 is also designed to implement further auxiliary counting and display functions to count the filtering cycles carried out during a subsidiary period, a fraction of the total service life of the cartridge, preferably on a daily basis, to indicate a significant item of data concerning the temporary efficiency of the cartridge during the subsidiary period. The auxiliary counting and display means are preferably incorporated into the principal processor of circuit 10 or comprise a separate processor 13. Likewise the means designed to display the item of data representing the temporary efficiency of the cartridge can be incorporated into display 11 or comprise a separate display 14.

In a preferred embodiment, the display 14 is of the graphic bar type 15, with one bar for each permissible filtering cycle in a period of one day. The type of display may be either of the direct counting type (one bar is activated for each filtering cycle performed during the day) or the reverse counting type (the bars are all activated at the start of the day and are deactivated as a result of each filtering cycle performed).

Different numerical or graphic displays, for example pie chart graphics, representing percentage values relating to the original total value, and yet others, may however be used.

FIG. 3 illustrates a variant embodiment of display 11 in which in addition to the overall alphanumeric display and bar display 14 provision, is made for a cartridge exhaustion indicator 16 whose warning light 17 is illuminated in flashing mode when the count performed by circuit 10 indicates that the cartridge is exhausted. Provision is also made for the expiry date of the cartridge calculated as specified above to be noted in an appropriate space 18 of display 11 through the counting algorithm in the memory of the processors in circuit 10 or through other input means which are in themselves known (keyboard, stylus for a graphic tablet or other means).

Another feature of jug 1 and the counting and display means associated with it comprises the fact that the latter are designed to calculate and display the value of the useful residual lifetime of the cartridge, that being understood to be the value on the basis of which the need to replace the cartridge is indicated to the user, that is or the overall time to expiry of the efficient useful lifetime of the same, as a function of the most restrictive counting value during the period attributing the minimum value between the maximum value and the residual value in case any cycles of the subsidiary period were already performed for the subsidiary period to each residual subsidiary period. This value is further moderated by the count of the cartridge exhaustion time counted independently of the use of the latter (that is from the expiry date of the cartridge counted from first use).

By way of example, it is assumed that cartridge 4 has a daily useful capacity of 5 liters (5 l/day), a total capacity of 100 liters, equal to 100 filtering cycles of 1 liter each, and a period from initialisation not exceeding 30 days.

The total maximum capacity of the cartridge would only be reached if the 100 liters were filtered within the thirty days of its lifetime at a rate not exceeding 5 liters per day. If however during the first 20 days the user uses the cartridge for the daily filtering of only two liters, then by the $21^{st}$ day he would not have a residual capacity of 60 liters, as would be counted if there had been no use during the subsidiary period, but would have a total residual capacity of 50 liters, equal to the maximum daily use (5 liters) for the number of residual days (10) to the expiry time. In this way there is therefore the certainty that the condition of cartridge exhaustion will be indicated taking into account the most restrictive of the three factors involved in determining the exhaustion condition of the cartridge—the time since initialisation, the overall number of filtering cycles and the limit on the daily filtering cycles under efficient conditions.

The method according to this invention is intended to monitor and control the efficiency of a filtering cartridge in a replaceable cartridge filtering device. This method comprises a stage of counting and displaying the filtering cycles performed by the cartridge in order to indicate that the latter is exhausted at the end of a period corresponding to its efficient useful life, and an auxiliary stage of counting and displaying the filtering cycles performed by the cartridge during the subsidiary period of the period, for example on a daily basis, in order to indicate an item of data representing the temporary efficiency of the cartridge during the subsidiary period.

The counting and display stage is carried out by calculating and displaying the value of the residual useful life of the cartridge according to the most restrictive count value during the period, attributing the minimum value between the maximum value and the residual value during the subsidiary period to each subsidiary period of the residual period.

The invention thus resolves the problem stated by improving monitoring of the useful life of filtering cartridges in relation to both filtering cartridges and different uses in which the filtering system is of the cartridge type or a replaceable filtering material in general.

The invention claimed is:

1. Replaceable cartridge filtering jug comprising, means for counting and displaying the filtering cycles performed by the cartridge in order to indicate exhaustion of the cartridge at the end of a period corresponding to its efficient useful life, and auxiliary means of counting and display which are capable of counting the filtering cycles performed in a subsidiary period of said period to indicate an item of data representing the temporary efficiency of the cartridge during the subsidiary period.

2. The filtering jug according to claim 1 in which the subsidiary period has a daily frequency.

3. The filtering jug according to claim 2 in which said counting and display means are designed to calculate and display the value of the residual useful life of the cartridge on the basis of the most restrictive count value during the period, attributing a minimum value between a maximum value and the residual value during the subsidiary period to each subsidiary period.

4. The filtering jug according to claim 1 in which said counting and display means are designed to calculate and display the value of the residual useful life of the cartridge on the basis of the most restrictive count value during the period, attributing a minimum value between a maximum value and the residual value during the subsidiary period to each subsidiary period.

5. Method for monitoring and controlling the efficiency of a filtering cartridge for a replaceable cartridge filtering device comprising, the step of counting and displaying the filtering cycles performed by the cartridge to indicate that the cartridge is exhausted at the end of a period corresponding to its efficient useful life and the step, of auxiliary counting and display of the filtering cycles performed by the cartridge in a subsidiary period of said period to indicate an item of data representing the temporary efficiency of the cartridge in the subsidiary period.

6. The method according to claim 5, in which the subsidiary period has a daily frequency.

7. The method according to claim 6 in which the said counting and display step is performed by calculating and displaying the value of the residual useful life of the cartridge on the basis of the most restrictive count value during the period, attributing a minimum value between a maximum value and the residual value in the subsidiary period to each subsidiary period of the residual period.

8. The method according to claim 5 in which the said counting and display step is performed by calculating and displaying the value of the residual useful life of the cartridge on the basis of the most restrictive count value during the period, attributing a minimum value between a maximum value and the residual value in the subsidiary period to each subsidiary period of the residual period.

9. Replaceable cartridge filtering jug comprising, means for counting filtering cycles indicating the exhaustion of the cartridge at the end of a period corresponding to the useful life of the cartridge, and auxiliary means of counting capable of counting the filtering cycles performed in a subsidiary period of said period to indicate data representing the temporary efficiency of the cartridge during the subsidiary period.

10. The filtering jug according to claim 9, including means displaying the count of the filtering cycles performed by the cartridge in the period.

11. The filtering jug according to claim 9, including means displaying the count of the filtering cycles performed in the subsidiary period.

12. The filtering jug according to claim 9, wherein said means for counting is a circuit.

13. The filtering jug according to claim 9, wherein said auxiliary means of counting is a circuit.

\* \* \* \* \*